US008315996B2

(12) United States Patent
McClements et al.

(10) Patent No.: US 8,315,996 B2
(45) Date of Patent: Nov. 20, 2012

(54) EFFICIENT MANAGEMENT OF CUSTOMIZED FUNCTIONALITY WITHIN SHARED DATA OBJECTS

(75) Inventors: Scott M. McClements, Hyde Park, NY (US); Kaushik Mukherjee, Wapingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 12/191,219

(22) Filed: Aug. 13, 2008

(65) Prior Publication Data
US 2010/0043015 A1 Feb. 18, 2010

(51) Int. Cl.
*G06F 17/00* (2006.01)
(52) U.S. Cl. ........................................ 707/695; 717/170
(58) Field of Classification Search .................. 707/695; 717/170
See application file for complete search history.

(56) References Cited

U.S. PATENT DOCUMENTS

| 5,313,646 | A | | 5/1994 | Hendricks et al. | ............ 395/600 |
| 5,369,778 | A | * | 11/1994 | San Soucie et al. | .................. 1/1 |
| 5,421,012 | A | * | 5/1995 | Khoyi et al. | .................. 718/107 |
| 5,555,388 | A | * | 9/1996 | Shaughnessy | ................ 711/100 |
| 5,555,418 | A | * | 9/1996 | Nilsson et al. | ................. 717/153 |
| 5,634,124 | A | * | 5/1997 | Khoyi et al. | ............ 1/1 |
| 5,740,359 | A | * | 4/1998 | Hasegawa et al. | ........... 714/47.3 |
| 6,449,659 | B1 | * | 9/2002 | Caron et al. | .................. 719/315 |
| 6,823,348 | B2 | * | 11/2004 | Benayoun et al. | ..................... 1/1 |
| 6,895,400 | B1 | * | 5/2005 | Hipp | ................................... 1/1 |
| 6,996,588 | B2 | | 2/2006 | Azagury et al. | ............. 707/204 |
| 7,010,793 | B1 | | 3/2006 | Chatterjee et al. | ............ 719/316 |
| 7,028,305 | B2 | * | 4/2006 | Schaefer | ....................... 719/310 |
| 7,072,800 | B1 | * | 7/2006 | Fernandez et al. | ............ 702/186 |
| 7,073,096 | B2 | * | 7/2006 | Pouyollon | .................. 714/38.14 |
| 7,472,122 | B2 | * | 12/2008 | Ishida et al. | .......................... 1/1 |
| 7,519,964 | B1 | * | 4/2009 | Islam et al. | .................... 717/177 |
| 7,536,686 | B2 | * | 5/2009 | Tan et al. | ...................... 717/174 |

(Continued)

FOREIGN PATENT DOCUMENTS
EP 0071002 2/1983

OTHER PUBLICATIONS

Yau, et al., "A Framework for Extensible Component Customization for Component-Based Software Development", Proceedings of the Sixth International Conference on Quality Software (QSIC'06), 2006, IEEE, pp. 8.*

(Continued)

*Primary Examiner* — Fred I Ehichioya
*Assistant Examiner* — Richard Bowen
(74) *Attorney, Agent, or Firm* — Steven Chiu; Ido Tuchman

(57) ABSTRACT

A method, system and computer program product for configuring an application instance. A first path by which an application instance is configured to access a version of a resource is determined. Additionally, a determination is made as to whether a configuration associated with the application instance exists in a shared resource area. If the configuration does not exist, a base version of the resource is modified to generate a customized version. A second path is determined, and the customized version is stored thereat. If the configuration exists, the second path is determined such that the resource included in the configuration can be accessed thereat. A symbolic link having an origin of the first path and a destination of the second path is created. Using the present invention, multiple application instances can efficiently share customized versions of resources.

15 Claims, 7 Drawing Sheets

U.S. PATENT DOCUMENTS

| | | | |
|---|---|---|---|
| 7,587,465 B1* | 9/2009 | Muchow | 709/209 |
| 7,707,565 B2* | 4/2010 | Bertelsmeier et al. | 717/145 |
| 7,757,226 B2* | 7/2010 | Srivastava et al. | 717/170 |
| 7,840,967 B1* | 11/2010 | Czajkowski et al. | 719/312 |
| 2003/0110190 A1* | 6/2003 | Achiwa et al. | 707/203 |
| 2004/0088681 A1* | 5/2004 | Berg et al. | 717/120 |
| 2004/0122827 A1* | 6/2004 | Cazemier | 707/100 |
| 2004/0243544 A1* | 12/2004 | Hipp | 707/1 |
| 2005/0177711 A1* | 8/2005 | Nog et al. | 713/100 |
| 2005/0210461 A1* | 9/2005 | Srivastava et al. | 717/170 |
| 2005/0267889 A1* | 12/2005 | Snyder et al. | 707/10 |
| 2006/0026583 A1* | 2/2006 | Remmel et al. | 717/162 |
| 2006/0069750 A1* | 3/2006 | Momtchilov et al. | 709/219 |
| 2006/0184673 A1* | 8/2006 | Liebman | 709/225 |
| 2007/0005745 A1* | 1/2007 | Bertelsmeier et al. | 709/223 |
| 2007/0240148 A1* | 10/2007 | Inada | 717/170 |
| 2008/0040385 A1 | 2/2008 | Barrall et al. | 707/103 Y |
| 2008/0066051 A1* | 3/2008 | Stubbs et al. | 717/107 |
| 2008/0098046 A1* | 4/2008 | Alpern et al. | 707/203 |
| 2008/0127054 A1* | 5/2008 | Stubbs et al. | 717/106 |
| 2008/0127084 A1* | 5/2008 | Sattler et al. | 717/121 |
| 2009/0064090 A1* | 3/2009 | Anonsen et al. | 717/104 |
| 2010/0023934 A1* | 1/2010 | Sheehan et al. | 717/168 |

OTHER PUBLICATIONS

Ouaiss et al., *Efficient Resource Arbitration in Reconfigurable Computing Environments*, ACM 2000 pp. 560-566 (2000).

John Deliessen et al., *An Efficient On-Chip Network Interface Offering Guaranteed Services, Shared Memory Extraction, And Flexible Network Configuration*, Computer Society pp. 1-6 (2004).

Quinn Hart et al., *Optimization of Multiple Continuous Queries over Streaming Satellite Data*, ACM GIS '06, pp. 243-250 (Nov. 10, 2006).

Naik et al., *Adaptive Resource in a Web Services Environment*, International Federation for Information Processing pp. 311-330 (2004).

* cited by examiner

EFFICIENT MANAGEMENT OF CUSTOMIZED FUNCTIONALITY WITHIN SHARED DATA OBJECTS

The present invention relates generally to software configuration. More specifically, the present invention relates to improved techniques for configuring a plurality of application instances to efficiently access customized versions of resources which are shared among the application instances.

BACKGROUND

Many server environments known in the art execute multiple instances of the same application simultaneously. Each of the application instances may maintain a separate area within a file system. The area within the file system may contain application resource files used by the application instance. Furthermore, the application resource files may contain configuration information used to configure the application instance. Application resource files may also be runtime files or data files.

In some environments, all of the application instances have identical configurations. Thus, the application instances may share common application resource files. Furthermore, the file system area for each application instance may contain symbolic links whose destinations are the shared application resource files. Symbolic linking is a technique known in the art wherein attempts to access data via a path which is the origin of the symbolic link cause data located at a path which is the destination of the symbolic link to be accessed instead. Thus, each application instance may beneficially access the shared application resource files without the need to create a separate copy of each resource file for each application instance.

In other environments, one or more application instances require customized configurations. Such application instances may require modified versions of the application resource files. The modified versions clearly cannot overwrite the original versions because other application instances may require the original versions. Thus, in some systems known in the art, shared application resource files requiring customization are copied to the file system area for the application instance requiring the customized version of the resource files.

SUMMARY OF THE INVENTION

The present invention addresses the above-mentioned limitations of the prior art by introducing improved techniques for configuring an application instance. An application instance may be an instance of an individual application or an application server. Customized versions of configurations and resources are generated and stored at a shared resource area. Symbolic links are created for the application instance. The destinations of the symbolic links are the versions of the configuration and the resources stored at the shared resource area which are required by the application instance. Thus, the application instance can efficiently find versions of the configuration and the resources which meet its requirements. The present invention and the fact that the configuration and the resources are stored at the shared resource area may be transparent to the application instance. Furthermore, a plurality of application instances sharing the same customized version of a configuration advantageously require the customized version of the configuration to be generated and stored only once.

Thus, one exemplary aspect of the present invention is a method for configuring an application instance. The method comprises determining a first path. The application instance is configured to access a version of a resource via the first path. The method further comprises determining whether a configuration associated with the application instance exists in a shared resource area. The method further comprises modifying a base version of the resource to generate a customized version of the resource, determining a second path, and storing the customized version of the resource in the shared resource area such that the customized version of the resource can be accessed via the second path if the configuration does not exist. The method further comprises determining the second path such that the resource included in the configuration can be accessed via the second path if the configuration exists. The method further comprises creating a symbolic link having an origin of the first path and a destination of the second path.

Another exemplary aspect of the present invention is a system for configuring an application instance. The system comprises a processor. The system further comprises a path determining unit configured to determine a first path. The application instance is configured to access a version of a resource via the first path. The system further comprises a configuration determining unit configured to determine whether a configuration associated with the application instance exists in a shared resource area. The system further comprises a customizing unit. The customizing unit is configured to modify a base version of the resource to generate a customized version of the resource, determine a second path, and store the customized version of the resource in the shared resource area such that the customized version of the resource can be accessed via the second path if the configuration determining unit determined that the configuration does not exist. The customizing unit is further configured to determine the second path such that the resource included in the configuration can be accessed via the second path if the configuration determining unit determined that the configuration exists. The system further comprises a linking unit configured to create a symbolic link having an origin of the first path and a destination of the second path.

Another exemplary aspect of the present invention is a computer program product embodied in computer readable memory comprising computer readable program codes coupled to the computer readable memory for configuring an application instance. The computer readable program codes are configured to cause the program to determine a first path. The application instance is configured to access a version of a resource via the first path. The computer readable program codes are further configured to cause the program to determine whether a configuration associated with the application instance exists in a shared resource area. The computer readable program codes are further configured to modify a base version of the resource to generate a customized version of the resource, determine a second path, and store the customized version of the resource in the shared resource area such that the customized version of the resource can be accessed via the second path if the configuration does not exist. The computer readable program codes are further configured to determine the second path such that the resource included in the configuration can be accessed via the second path if the configuration exists. The computer readable program codes are further configured to create a symbolic link having an origin of the first path and a destination of the second path.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
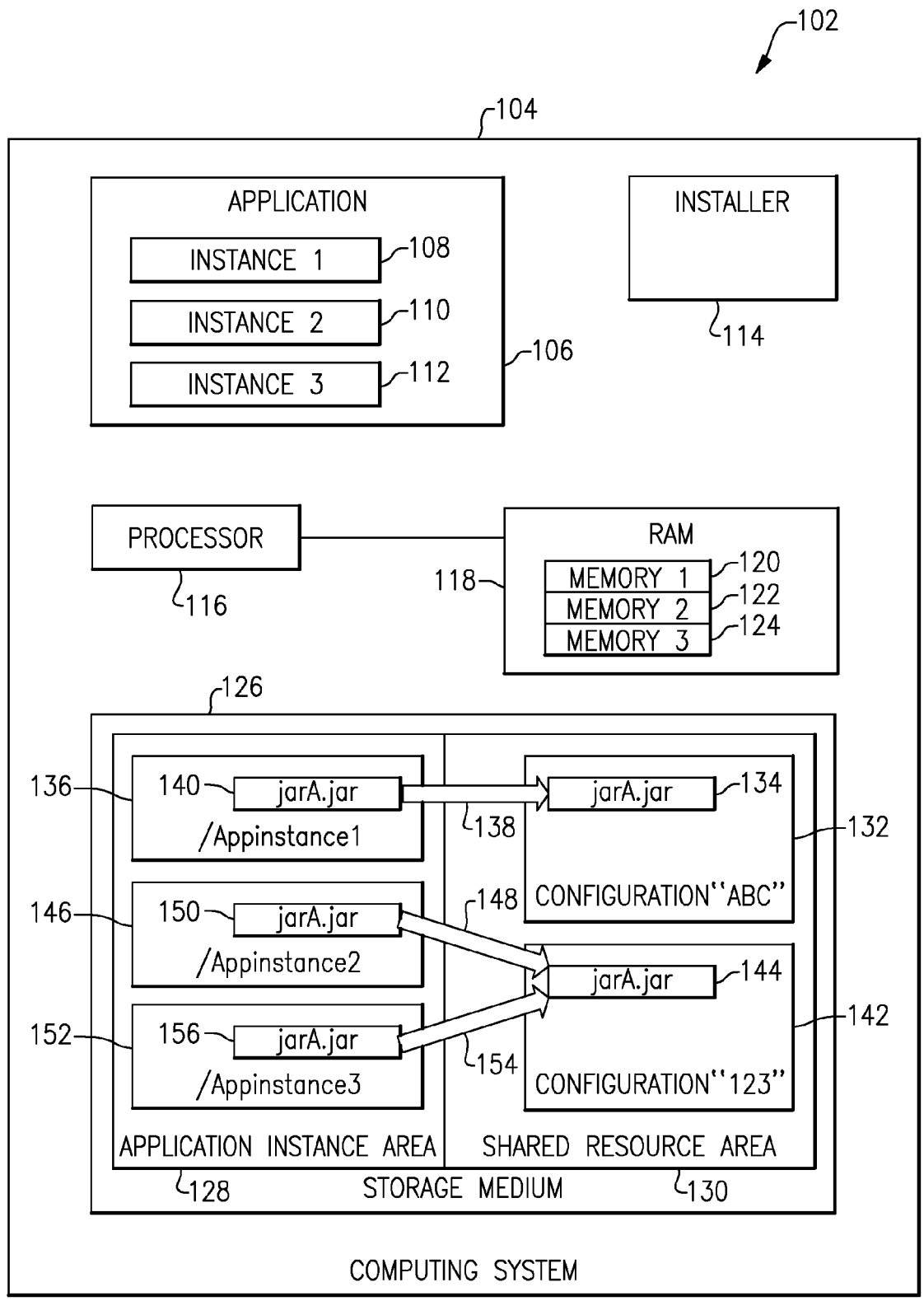
FIG. 1 shows an exemplary system embodying the present invention.

The following description details how the present invention is employed to configure a software application instance. Throughout the description of the invention reference is made to FIGS. 1-7. When referring to the figures, like structures and elements shown throughout are indicated with like reference numerals.

FIG. 1 shows an exemplary system embodying the present invention. The system 102 may assume any of a wide variety of forms. It may be designed to accomplish any of a variety of goals.

The system 102 includes a computing system 104. The computing system may be a general purpose computer. The computing system may incorporate any of a wide variety of architectures. The computing system may be based on any operating system implementing symbolic links or any other technique for allowing a first location in a file system to be associated with a second location in a file system. For example, the computing system may be based on a general purpose operating system such as the IBM® z/OS® operating system, the IBM AIX® operating system, the Linux® operating system, any flavor of the UNIX® operating system or the Windows Vista® operating system. IBM, z/OS and AIX are registered trademarks of International Business Machines Corporation, Armonk, N.Y., United States, in the United States, other countries, or both. Linux® is the registered trademark of Linus Torvalds in the United States and other countries. UNIX is a registered trademark of The Open Group. Windows Vista is a registered trademark of Microsoft Corporation, Redmond, Wash., United States, in the United States and/or other countries.

The computing system 104 may be configured to implement one or more application servers. Such application servers may include the WebSphere® application server and the Apache™ Geronimo™ application server. WebSphere is a registered trademark of International Business Machines Corporation, Armonk, N.Y., United States, in the United States, other countries, or both. Apache and Geronimo are trademarks of The Apache Software Foundation, Forest Hill, Md., United States.

The computing system 104 hosts one or more computer program applications 106. An application may be designed to accomplish any of a variety of goals. In furtherance of these goals, an application may perform any of a wide variety of steps. An application may comprise program code expressed in any of a variety of programming languages known in the art. Specifically, an application may include computer program code written in an object oriented programming language such as the Java™ programming language, the "C++" programming language or the like. Java is a trademark of Sun Microsystems, Inc., Santa Clara, Calif., United States, in the United States and other countries. An application may also include computer program code written in a conventional procedural programming language, such as the "C" programming language or similar programming languages.

In an embodiment of the present invention, as shown in FIG. 1, each application 106 has one or more application instances 108, 110, 112. The application instances may be executed by an application server. Application instances which are instances of the same application may share common program code. However, each application instance may have a distinct configuration and may operate on distinct data. As a result, the behavior of different instances of the same application may diverge significantly from each other.

In another embodiment of the present invention, one or more instances of an application server exist. Accordingly, each application instance 108, 110, 112 is an instance of an application server, as opposed to an individual application executing at an application server. For example, each application instance may be a separate instance of the WebSphere Application Server. Each instance of the application server may then execute one or more individual applications. It is noted that the term "application instance", as used herein, expressly includes the case wherein the application instance is an instance of an application server.

An application instance may require a specific configuration. A configuration may comprise configuration data regarding at least one application instance. A configuration consists of one or more resources. The resources may include instructions and data which impact the behavior of the application instance. In an embodiment of the present invention, the resources comprise one or more files. The application instance is configured to read the one or more files to access the instructions and data. The application instance then configures itself according to the read instructions and data.

In an embodiment of the present invention, a configuration comprises one or more Java ARchive (JAR) files. A JAR file may contain one or more files within a single file. The files contained in the JAR file may include Java classes and data files. JAR files customarily have file names ending in the extension, ".jar". JAR files are primarily associated with the Java platform.

In the exemplary system shown in FIG. 1, the computing system 104 hosts three application instances. All three application instances are instances of the same application. The exemplary application and its instances are designed to be executed by the WebSphere application server.

The first instance, known as application instance 1 108, requires a configuration known as configuration ABC. Configuration ABC is a base version of the configuration which is intended to be suitable for most application instances.

The second instance, known as application instance 2 110, requires a different configuration known as configuration 123. Configuration 123 is a customized version of the configuration which is based on configuration ABC. However, configuration 123 additionally enables and configures three optional products, numbered product 1, product 2 and product 3. The products may be, for example, products for the WebSphere Application Server.

The final instance, known as application instance 3 112, is also configured to work with product 1, product 2 and product 3. Therefore, application instance 3 also requires configuration 123. As a result, product 1, product 2 and product 3 are enabled and configured for application instance 3 in the same manner as for application instance 2 110.

The application instances may be configured by an installer 114. The installer may be implemented in software, hardware or a combination thereof. The installer configures each application instance to use the configuration it requires. Thus, in the exemplary system shown in FIG. 1, the installer configures application instance 1 108 to use configuration ABC. The installer further configures application instance 2 110 to use configuration 123. The installer similarly configures application instance 3 112 to also use configuration 123.

In an embodiment of the present invention, the installer 114 does not create application instances 108, 110, 112. Instead, the installer configures application instances which are already present at the computing system 104. In another embodiment of the present invention, the installer creates one or more application instances. The installer subsequently configures the created one or more application instances.

The computing system 104 may be connected to a variety of peripheral devices. Peripheral devices may include input devices such as a keyboard and a mouse. Peripheral devices may also include output devices such as a display and a printer.

The computing system 104 includes one or more processors 116. A processor may be a general purpose microprocessor. The processor is configured to execute program code. Specifically, the processor executes applications 106 and application instances 108, 110, 112 thereof. The processor may also execute computer code included in the installer 114.

The computing system 104 further includes random access memory 118. Random access memory (RAM) may contain program code which is executed by the processor 116. RAM may also contain data which is operated on by program code. RAM may contain configurations and resources included therein.

While executing, each application instance has space in RAM allocated to it. This allocated space may store program code for the application instance. The allocated space may also store data associated with the application instance. The allocated space may further store resources included in the configuration of the application instance. In the exemplary system of FIG. 1, memory space 120 is allocated to application instance 1 108, memory space 122 is allocated to application instance 2 110 and memory space 124 is allocated to application instance 3 112.

The computing system 104 further includes one or more storage media 126. A storage media may be any technological device configured to store data in a computer readable format. Specifically, storage media may include hard drives, floppy drives, optical drives, flash drives and RAM.

The storage media 126 may be arranged into one or more hierarchical file systems. In a hierarchical file system, files are arranged into containers known as directories. Generally, any directory may contain one or more other directories. A directory thus contained in another directory is known in the art as a subdirectory. In this manner, directories may be nested to arbitrary levels of depth. The highest-level directory is known as the root directory. All directories and files in the file system are directly or indirectly contained by the root directory. Therefore, a hierarchical file system may be envisioned as a tree structure wherein the root directory is the base of the tree and all directories and files are arranged relatively to the root. It is noted that while the terminology described above are used hereinafter, the present invention does not require that the operating system uses the terminology described above in regards to file system concepts.

A file or directory in a hierarchical file system may be identified using a path. A full path specifies the name of the file or directory, as well as the name of all directories directly or indirectly containing the file or directory. For example, in many operating systems known in the art, the root directory is identified by a forward slash ("/"). The path thus begins with a forward slash. Descending from the root directory, the name of each successive directory is listed, followed by a forward slash. Finally, the name of the file or directory itself is listed at the end of the path. Thus, if a file named "myFile" is contained in a directory named "myDirectory" which is contained directly by the root directory, the path of the file will be "/myDirectory/myFile" according to this convention. It is noted that while the convention outlined above for paths is used hereinafter, the present invention does not require that the operating system expresses paths according to this convention.

A symbolic link associates a first location in a hierarchical file system with a second location in the same file system. Thus, if a request to access the file located at the first location is received, the file located at the second location is accessed instead. For example, suppose that a symbolic link associates the file identified by the path "/symbolic/link" with the file identified by the path "/myDirectory/myFile". Suppose also that a process places a request to the operating system to read the contents of the file identified by the path "/symbolic/link". Because the path "/symbolic/link" is symbolically linked to the path "/myDirectory/myFile", the operating system will instead read the contents of the file identified by the path "/myDirectory/myFile". It is noted that a symbolic link is also known in the art as a symlink, particularly in the UNIX family of operating systems. It is emphasized that the present invention may be employed in conjunction with any operating system or other system configured to allow a first location in a file system to be associated with a second location in a file system as described above, even if this association is known by a different name.

As used herein, the term, "file system", includes all files accessible via a common directory structure. Many operating systems known in the art allow a volume, such as a storage medium or a partition thereof, to be mounted within a file system at a specific location. Such a location may be known as a mount point. Thus, any path including the mount point is located by accessing the mounted volume. In the context of the present invention, if a volume is mounted in this manner, the mounted volume is considered part of the same file system as the volume at which it is mounted because both volumes are accessible using a common directory structure.

In an embodiment of the present invention, the storage media 126 are subdivided into an application instance area 128 and a shared resource area 130. The application instance area includes files which are associated with specific application instances 108, 110, 112. The shared resource area includes files which are not uniquely associated with a specific application instance. Accordingly, files in the shared resource area may be shared among a plurality of application instances.

In another embodiment of the present invention, not all of the application instances are associated with the same application instance area. For example, each application instance may be associated with a separate application instance area.

The application instance area 128 and shared resource area 130 may be physically distinct storage media. The application instance area and shared resource area may instead be partitions of the same physical disk drive. The application instance area and shared resource area may even simply be different directories within a single partition of a storage medium. In all of these cases, the application instance area and shared resource area may nonetheless be included within a single hierarchical file system. In an embodiment of the present invention, the shared resource area is mounted at a specific point within a directory structure in which the application instance area is accessible. As a result, the application instance area and shared resource area may be addressed as if they were included in the same file system even if the two areas are physically distinct.

In an embodiment of the present invention, one or more files included in each configuration are contained in the shared resource area 130. By contrast, each application instance 108, 110, 112 is configured to access each of the one or more files associated with its configuration via a path having a destination located in the application instance area 128. For each file included in the configuration, a symbolic link exists. The symbolic link has an origin of the path accessed by the application instance and a destination of a path at which the file is actually located. It is emphasized that the one or more symbolic links enable an application instance to access the one or more files contained in the shared resource area even if the application instance has no knowledge that the shared resource area exists.

In an embodiment of the present invention, each application instance 108, 110, 112 is associated with a directory. The directory may be located in the application instance area 128. The paths by which an application instance is configured to access the files associated with its configuration may be located within the directory associated with the application instance.

In the exemplary system of FIG. 1, the shared resource area 130 initially includes a configuration ABC 132. Configuration ABC comprises a configuration file named "jarA.jar" 134. In this example, configuration ABC is the base version of the configuration for the application 106. Thus, alternate configurations for the application may be generated by modifying configuration ABC in order to generate customized versions of the configuration. It is contemplated that if any variations to the configuration of an application instance are required, an additional customized configuration needs to be generated in this manner in order to implement the required variations.

In an embodiment of the present invention, the installer always generates customized versions of configurations by modifying the base version of the configuration. In another embodiment of the present invention, the installer may generate a customized version of a configuration by modifying an existing customized version of the configuration.

As previously noted, application instance 1 108 requires configuration ABC 132. Accordingly, the installer 114 configures application instance 1 to access directory AppInstance1 136. The installer further creates a symbolic link 138. The origin of the symbolic link is a file named jarA.jar 140 within the AppInstance1 directory. The destination of the symbolic link is the jarA.jar file 134 in configuration ABC in the shared resource area 130. Thus, application instance 1 may access the appropriate version of jarA.jar via a path located within the AppInstance1 directory.

Moreover, as previously noted, application instance 2 110 requires configuration 123. However, configuration 123 does not yet exist. Therefore, the installer creates configuration 123 142 by modifying configuration ABC to generate a customized version thereof. This customization includes modifying the file jarA.jar 134 included in configuration ABC to create a customized version of jarA.jar 144 which is included in configuration 123. Configuration 123, with the customized version of jarA.jar included therein, is stored within the shared resource area 130.

Once configuration 123 142 exists, the installer 114 configures application instance 2 110 to access directory AppInstance2 146. The installer further creates a symbolic link 148. The origin of the symbolic link is a file named jarA.jar 150 within the AppInstance2 directory. The destination of the symbolic link is the jarA.jar file 144 in configuration 123 in the shared resource area 130. Thus, application instance 2 may access the appropriate version of jarA.jar via a path located within the AppInstance2 directory.

Furthermore, as previously noted, application instance 3 112 also requires configuration 123 142. Because configuration 123 already exists, the installer 114 does not need to repeat the customization of configuration ABC 132. The installer may instead simply associate application instance 3 with the existing version of configuration 123. Accordingly, the installer 114 configures application instance 3 to access directory AppInstance3 152. The installer further creates a symbolic link 154. The origin of the symbolic link is a file named jarA.jar 156 within the AppInstance3 directory. The destination of the symbolic link is the jarA.jar file 144 in configuration 123 in the shared resource area 130. Thus, application instance 3 may access the appropriate version of jarA.jar via a path located within the AppInstance3 directory.

It is emphasized that as a result of the process described above, the present invention allows a plurality of different configurations to be efficiently accessed. Furthermore, embodiments of the present invention allows one or more application instances to be efficiently customized "on the fly."

It is emphasized that the existence of the shared resource area is transparent to an application instance. Moreover, the application instance may be unaware that its configuration is one of a plurality of configurations stored at the shared resource area. The application instance may simply access its configuration by specifying one or more paths located within the application instance area. Because the specified paths are the origins of symbolic links configured by the installer, the application instance accesses the configuration resources at the destinations of the symbolic links. Therefore, the configuration and the resources included therein are accessed despite being stored at the shared resource area. It is contemplated that as a result, the application instances behave as if the customized versions of the resources had been copied into each application instance's directory within the application instance area, instead of the symbolic links being present.

Furthermore, it is emphasized that neither the application nor the individual application instances are required to embody logic or program code for implementing the configuration. This is the case because the installer may fully implement the configuration. The installer may include all logic required to configure the symbolic links and the shared resources. Specifically, the installer may be aware of which customized versions of shared resources, e.g., JAR files, are required by each application instance. The installer may also be aware of which configurations are available in the shared resource area.

Thus, broadly speaking, the installer may implement the present invention. The application and the individual application instances may not require, and therefore may fail to incorporate, logic or program code for implementing the present invention.

The system shown in FIG. 1 is advantageous for a number of reasons. First, any updates to the configurations stored at the shared resource area are automatically reflected across all application instances using the updated configurations. Thus, all application instances using the shared configuration always remain in synchronization. Following a symbolic link causes the current version of the file at the destination of the symbolic link to be accessed. Therefore, updating the configurations does not require modifying the symbolic links or any other data stored at the application instance area.

Second, if two or more application instances require the same configuration, the configuration only needs to be customized for the first such application instance. For the second application instance and any subsequent application instances, the customized configuration already exists at the shared resource area. Thus, it is possible to simply create one or more symbolic links to the existing customized configuration. Generally, creating symbolic links requires a minimal amount of resources. In particular, the amount of CPU time and other resources required to create a symbolic link is generally significantly less than that required to physically copy a file. Therefore, when two or more application instances share a common configuration, the number of CPU cycles required for configuration is reduced.

Third, in the case discussed above where two or more application instances require the same configuration, only one copy of the configuration is required. More generally, only a single copy of any particular resource is required because any application instance requiring the resource may create a symbolic link to it. Therefore, the disk space requirements have a (1:n) ratio instead of an (n:n) ratio, where n is the number of application instances sharing a common configuration. Accordingly, when two or more application instances share a common configuration, the amount of disk space required for configuration is reduced.

Fourth, any copying and modifying of a resource carries an inherent risk of corrupting the resource. In the case where two or more application instances require the same configuration, the customized configuration only needs to be copied and modified once. Accordingly, when two or more application instances share a common configuration, the probability that a duplicated shared resource is corrupted is reduced. Because such corruption may result in unpredictable behavior, the risk of unpredictable behavior is accordingly reduced.

Figure 2:
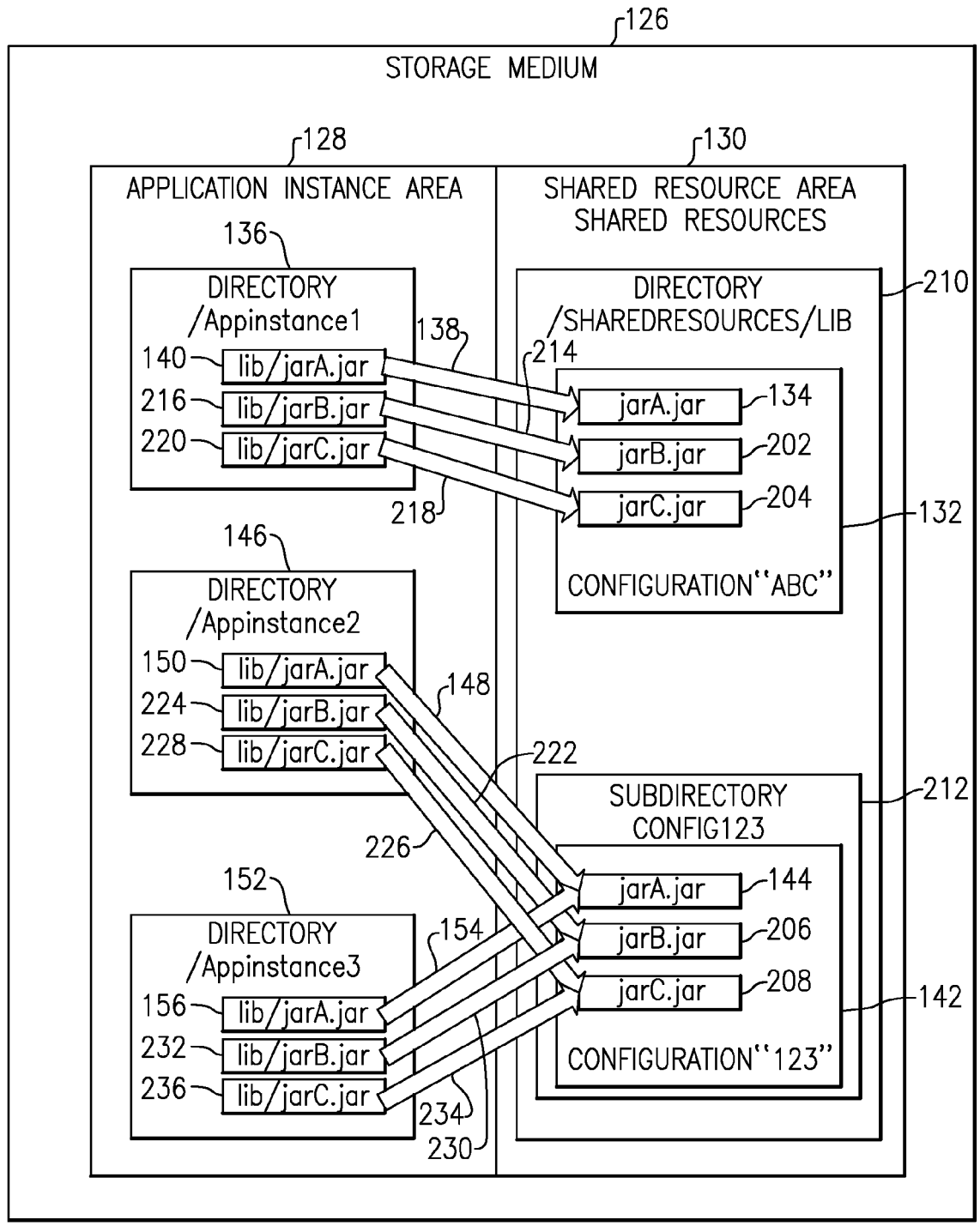
FIG. 2 provides additional detail about an exemplary file system embodying the present invention.

Turning now to FIG. 2, additional detail is provided about an exemplary file system embodying the present invention.

The file system is included in one or more storage media 126, such as the storage media described in FIG. 1. The storage media may be included in a computing system such as the exemplary computing system shown in FIG. 1.

In the exemplary file system of FIG. 2, the storage media 126 are subdivided into an application instance area 128 and a shared resource area 130 as described above in regards to FIG. 1. The shared resource area is a distinct volume from the application instance area. Nonetheless, the application instance area and shared resource area are included within a single hierarchical file system. Therefore, the application instance area and shared resource area share a common directory structure. Specifically, the shared resource area is mounted within the shared file system at a mount point having a path of "/SharedResources". It is noted that as a result, files and directories having paths beginning with "/SharedResources" are located in the shared resource area. Conversely, files and directories having paths not beginning with this prefix are not located in the shared resource area.

In an embodiment of the present invention, the shared resource area 130 is read-only while the application instances are executing. Even a privileged user or "superuser" cannot write to the shared resource area while the application instances are running. This read-only status may be achieved by mounting the shared resource area in a read-only mode before starting the application instances. To modify data and configuration information located at the shared resource area, the shared resource area may be unmounted and then remounted in a writeable mode.

In another embodiment of the present invention, the shared resource area 130 is writeable while the application instances are executing. Nonetheless, file system permissions may prevent application instances from writing to the shared resource area.

The shared resource area 130 includes one or more configurations 132, 142. The configurations may be similar to the configurations described above in regards to FIG. 1. In the exemplary configurations shown in FIG. 2, the resources included in the configurations are files stored at the shared resource area.

The configurations stored at the shared resource area may include a base version of a configuration. The exemplary file system shown in FIG. 2 includes configuration ABC 132, which is a base version of a configuration. Configuration ABC comprises three configuration files, named "jarA.jar" 134, "jarB.jar" 202 and "jarC.jar" 204. As the extension implies, all three files are JAR files.

The configurations stored at the shared resource area may further include one or more customized versions of the configuration. The customized versions of the configuration are generated from the base version of the configuration. Specifically, one or more resources included in the base version of the configuration are modified to generate customized versions of the one or more resources. The resulting customized versions of the one or more resources are then stored as part of the customized version of the configuration. The exemplary file system shown in FIG. 2 includes configuration 123 142, which is a customized version of configuration ABC 132. Configuration 123 comprises three configuration files, named "jarA.jar" 144, "jarB.jar" 206 and "jarC.jar" 208. As in configuration ABC, all three files are JAR files. Each of the configuration files included in configuration 123 was generated from the file of the same name included in configuration ABC.

A configuration may have an identity. The identity may distinguish the configuration from other configurations within a common namespace. In the exemplary file system shown in FIG. 2, the identity of the configuration ABC 132 is "ConfigABC". The identity of the configuration 123 142 is "Config123".

A configuration may be stored at a specific directory within the file system. In an embodiment of the present invention, the path of the directory at which a customized version of a configuration is stored is dependent on the identity of the configuration. Specifically, the directory containing the customized version of the configuration may have a name based on the identity of the configuration. The base version of the configuration may be stored in a directory having a path as described above. The base version of the configuration may instead be stored in a base directory having a path which does not depend on or contain the identity of the configuration.

In a further embodiment of the present invention, the base version of a configuration is included in a specific directory. Each customized version of the same configuration is stored in a subdirectory of the directory in which the base version of the configuration is stored. The subdirectory containing a customized version of a configuration may have the same name as the identity of the configuration, possibly with minor transformations.

The file system shown in FIG. 2 is structured according to this further embodiment. Configuration ABC 132, the base version of the configuration, is stored in a directory having a path of "/SharedResources/lib" 210. Those skilled in the art will appreciate that directories named "lib" frequently contain library files, such as configuration files and data files. Configuration 123 142, a customized version of configuration ABC, is stored in a subdirectory of this directory named "Config123" 212. Thus, the full path of this subdirectory is "/SharedResources/lib/Config123".

It is emphasized that the present invention does not require that the configurations are stored within a directory structure such as the exemplary directory structure stored above. To the contrary, the configurations may be structured in any manner, although it is contemplated that each resource (e.g., a JAR file) included in a configuration is uniquely identifiable within a namespace. The correct configuration for an application instance may instead be located using an Extensible Markup Language (XML) file, a property file or any other type of catalog to locate the correct configuration. Extensible Markup Language and XML are trademarks (registered in numerous countries) of the World Wide Web Consortium; marks of W3C are registered and held by its host institutions MIT, ERCIM, and Keio.

In an embodiment of the present invention, an XML file specifies metadata describing different versions of the configuration. The metadata may specify the directory in which each version of the configuration is stored. The metadata advantageously allows each application instance to be associated with the correct configuration even if the application instance and/or the installer lack hard-coded logic as to which configuration should be applied. Nonetheless, it is contemplated that a convention exists as to how the configuration associated with each instance is named.

The application instance area 128 includes files which are associated with specific application instances. The application instance area may be writeable, although file system permissions may nonetheless prevent a particular process or user from accessing a particular file. The exemplary file system shown in FIG. 2 includes files related to the three application instances introduced in FIG. 1. Each application instance is associated with a directory located in the application instance area. Thus, application instance 1 is associated with the directory having a path of "/AppInstance1" 136. Application instance 2 is associated with the directory having a path of "/AppInstance2" 146. Application instance 3 is associated with the directory having a path of "/AppInstance3" 152. Each application instance is configured to access the files associated with its configuration via the directory with which it is associated.

As in FIG. 1, application instance 1 requires configuration ABC 132. A symbolic link 138 has an origin of the file having the path "/AppInstance1/lib/jarA.jar" 140 and a destination of the file having the path "/SharedResources/lib/jarA.jar" 134. Application instance 1 is configured to access the configuration file named "jarA.jar" via the path "/AppInstance1/lib/jarA.jar". However, when this path is accessed, the symbolic link causes the file located at the path "/SharedResources/lib/jarA.jar" to be accessed instead. Therefore, the version of jarA.jar included in configuration ABC is accessed even though application instance 1 accessed a path located in its own directory.

Similarly, a symbolic link 214 has an origin of the file having the path "/AppInstance1/lib/jarB.jar" 216 and a destination of the file having the path "/SharedResources/lib/jarB.jar" 202. Another symbolic link 218 has an origin of the file having the path "/AppInstance1/lib/jarC.jar" 220 and a destination of the file having the path "/SharedResources/lib/jarC.jar" 204. Application instance 1 is configured to access the configuration files named "jarB.jar" and "jarC.jar" via the paths "/AppInstance1/lib/jarB.jar" and "/AppInstance1/lib/jarC.jar", respectively. However, when these paths are accessed, the symbolic link causes the files located at the paths "/SharedResources/lib/jarB.jar" and "/SharedResources/lib/jarC.jar", respectively, to be accessed instead. Therefore, the versions of jarB.jar and jarC.jar included in configuration ABC are accessed even though application instance 1 accessed paths located in its own directory.

As in FIG. 1, application instance 2 requires configuration 123. A symbolic link 148 has an origin of the file having the path "/AppInstance2/lib/jarA.jar" 150 and a destination of the file having the path "/SharedResources/lib/Config123/jarA.jar" 144. Another symbolic link 222 has an origin of the file having the path "/AppInstance2/lib/jarB.jar" 224 and a destination of the file having the path "/SharedResources/lib/Config123/jarB.jar" 206. Another symbolic link 226 has an origin of the file having the path "/AppInstance2/lib/jarC.jar" 228 and a destination of the file having the path "/SharedResources/lib/Config123/jarC.jar" 208. Application instance 2 is configured to access its configuration files via the paths included in the "/AppInstance2/lib" directory. However, when one of these paths is accessed, the symbolic link causes the file of the same name and included in the "/SharedResources/lib/Config123" directory to be accessed instead. Therefore, the versions of the configuration files included in configuration 123 are accessed even though application instance 2 accessed paths located in its own directory.

As in FIG. 1, application instance 3 also requires configuration 123. A symbolic link 154 has an origin of the file having the path "/AppInstance3/lib/jarA.jar" 156 and a destination of the file having the path "/SharedResources/lib/Config123/jarA.jar" 144. Another symbolic link 230 has an origin of the file having the path "/AppInstance3/lib/jarB.jar" 232 and a destination of the file having the path "/SharedResources/lib/Config123/jarB.jar" 206. Another symbolic link 234 has an origin of the file having the path "/AppInstance3/lib/jarC.jar" 236 and a destination of the file having the path "/SharedResources/lib/Config123/jarC.jar" 208. Application instance 3 is configured to access its configuration files via the paths included in the "/AppInstance3/lib" directory. However, when one of these paths is accessed, the symbolic link causes the file of the same name and included in the "/SharedResources/lib/Config123" directory to be accessed instead. Therefore, the versions of the configuration files included in configuration 123 are accessed even though application instance 3 accessed paths located in its own directory.

It is noted that in the exemplary file structure described above, the symbolic links have origins which are files within a subdirectory of the highest level directory of each application instance. This subdirectory is named "lib". By separating files managed according to the present invention into one or more subdirectories, the application instance directory may additionally contain files and directories required by the application instance which are not managed according to the present invention.

In another embodiment of the present invention, the origins of the symbolic links are directories which include resources that an application instance is configured to access in order to configure itself. The destinations of the symbolic links are directories in which the resources are actually located. For example, a symbolic link may be created having an origin of the directory having the path "/AppInstance1/lib" and a destination of the directory having the path "/SharedResources/lib". Thus, if application instance 1 accesses the configuration file named "jarA.jar" via the path "/AppInstance1/lib/jarA.jar", the symbolic link causes the file located at the path "/SharedResources/lib/jarA.jar" to be accessed instead. Therefore, the version of jarA.jar included in configuration ABC is accessed as in the preceding example. This embodiment advantageously requires less administrative overhead to configure compared to the embodiment demonstrated in the preceding example. However, flexibility is disadvantageously reduced.

A customized version of a configuration may include only those resources which require customization. For any resource not included in the customized version of the configuration, the base version of the resource may be accessed instead. More precisely, the version of the resource included in the base version of the configuration is accessed. Thus, if a resource is included in the customized version of the configuration, the symbolic link associated with the resource has a destination of the version of the resource included in the customized version of the configuration. If instead a resource is omitted from the customized version of the configuration, the symbolic link associated with the resource has a destination of the version of the resource included in the base version of the configuration.

For example, suppose that another application instance, application instance 4, requires a customized version of the configuration with an identifier of "Config1234". This customized version of the configuration is identical to the base version of the configuration except that the resource "jarB.jar" is modified. Accordingly, a symbolic link has an origin of the file having the path "/AppInstance4/lib/jarB.jar" and a destination of the file having the path "/SharedResources/lib/Config1234/jarB.jar". Application instance 4 is configured to access the configuration file named "jarB.jar" via the path "/AppInstance4/lib/jarB.jar". When this path is accessed, the symbolic link causes the file located at the path "/SharedResources/lib/Config1234/jarB.jar" to be accessed instead. Therefore, the customized version of jarB.jar included in configuration 1234 is accessed.

Another symbolic link has an origin of the file having the path "/AppInstance4/lib/jarC.jar" and a destination of the file having the path "/SharedResources/lib/jarC.jar". Application instance 4 is configured to access the configuration file named "jarC.jar" via the path "/AppInstance4/lib/jarC.jar". When this path is accessed, the symbolic link causes the file located at the path "/SharedResources/lib/jarC.jar" to be accessed instead. Therefore, the version of jarC.jar included in the base version of the configuration is accessed. Thus, application instance 4 accesses the version of jarB.jar included in the customized version of the configuration and the version of jarC.jar included in the base version of the configuration.

Any number of resources may be included in a customized version of a configuration as described above. Similarly, any number of resources may be omitted from the customized version of a configuration and therefore accessed via the base version of the configuration. For example, the customized version of the configuration with an identifier of "Config1234" could additionally include a customized version of jarA.jar.

It is contemplated that in some environments, a base version of a resource will not require customization for any configuration. In such cases, all configurations may cause the base version of the resource to be accessed as described above. A customized version may, however, contain customized versions of every other resource included in the base version of the configuration. For example, a base version of an exemplary configuration may include three resources, "jarX.jar", "jarY.jar" and "jarZ.jar". jarZ.jar never requires customization, while jarX.jar and jarY.jar require customization for some application instances. Accordingly, a customized version of the configuration may include customized versions of jarX.jar and jarY.jar but may not include a customized version of jarZ.jar. For all application instances, the symbolic links associated with jarZ.jar have a destination of the version of jarZ.jar included in the base version of the configuration. However, for some application instances, the symbolic links associated with jarX.jar and jarY.jar have destinations of the versions of jarX.jar and jarY.jar respectively included in the base version of the configuration. For the remaining application instances, the symbolic links associated with jarX.jar and jarY.jar have destinations of the versions of jarX.jar and jarY.jar respectively included in the customized version of the configuration.

It is emphasized that the present invention does not require configurations to correspond to directories. In an embodiment of the present invention, a separate configuration is applied to each individual file. Thus, a first resource may be accessed via a symbolic link having a destination in a first subdirectory associated with a first customized version of a configuration. A second resource may be accessed via a symbolic link having a destination in a second subdirectory associated with a second customized version of the same configuration. This embodiment beneficially facilitates combining elements of a plurality of customized versions of a configuration.

Figure 3:
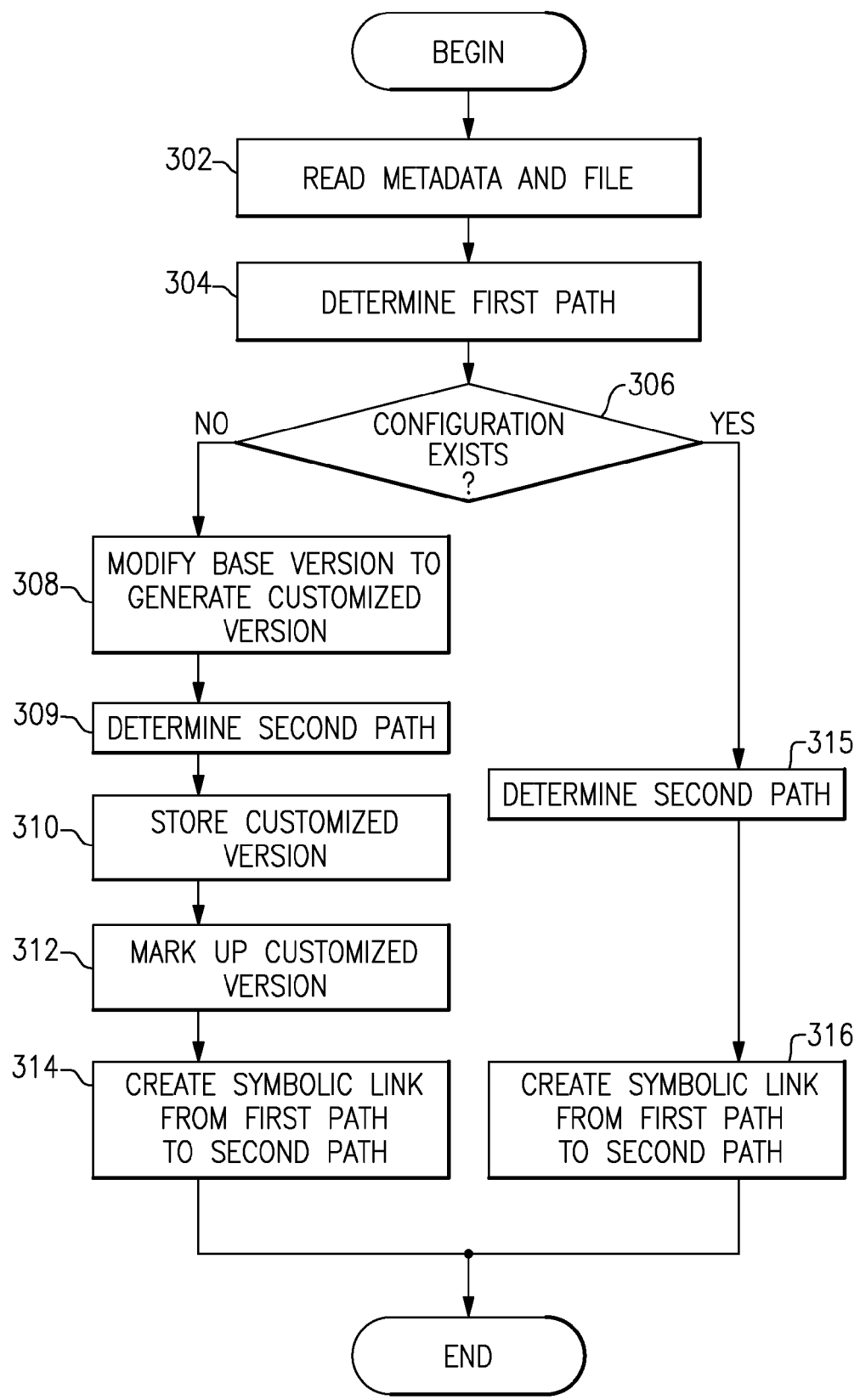
FIG. 3 shows an exemplary flowchart of operations performed by the present invention to customize a resource used to configure an application instance.

FIG. 3 shows an exemplary flowchart of operations performed by the present invention to customize a resource used to configure an application instance. The operations shown in the flowchart may be performed by an installer, such as the exemplary installer of FIG. 1.

At reading operation 302, metadata related to the configuration of the application instance may be read. Reading operation 302 may also comprise reading the resource. If the resource is a file in a storage medium, the storage medium may be accessed in order to read the file. After reading operation 302 is completed, control passes to determining operation 304.

At determining operation 304, a first path is determined. The application instance is configured to access a version of the resource via the first path. In an embodiment of the present invention, determining operation 304 modifies the application instance such that the application instance is configured to access the version of the resource via the first path. In another embodiment of the present invention, the application instance was configured, prior to determining operation 304, to access the version of the resource via the first path. Thus, determining operation 304 comprises determining the path by which the application was previously configured to access the version of the resource. Furthermore, these two embodiments may be combined. For example, determining operation 304 may determine that the application is already configured to access a version of a resource having a specific file name. Determining operation 304 may then modify the application instance so that it is configured to locate the file having that name within a specified configuration directory. After determining operation 304 is completed, control passes to determining operation 306.

At determining operation 306, it is determined whether a configuration associated with the application instance exists in a shared resource area. Determining operation 306 may further comprise determining whether a customized version of the resource included in the configuration exists in the shared resource area. The shared resource area may be similar to the shared resource area shown in FIGS. 1 and 2. Moreover, the configuration may have an identity.

In an embodiment of the present invention, determining operation 306 comprises determining whether a specific path exists. The path may be dependent on the identity of the configuration. Specifically, the path may include a directory having a name based on the identity of the configuration. The path may follow any of the exemplary conventions discussed above in regards to FIG. 2.

In another embodiment of the present invention, determining operation 306 comprises analyzing metadata to determine whether the configuration exists. The metadata may additionally be employed to determine the location of the configuration and of resources included therein. The metadata may be included in an XML file such as the exemplary XML metadata file described in regards to FIG. 2.

If the configuration does not exist, control passes to modifying operation 308. If the configuration exists but the customized version of the resource included therein does not exist, control may likewise pass to modifying operation 308 so that the customized version of the resource is generated. If the configuration exists, control passes to determining operation 315.

At modifying operation 308, a base version of the resource is modified to generate a customized version of the resource. The base version of the resource may be located within a file system according to any of the exemplary conventions discussed above in regards to FIG. 2. If the base version of the resource was not already read at reading operation 302, it may be read at modifying operation 308 in order to facilitate the modification. Modifying operation 308 may comprise any of a wide variety of transformations intended to customize the resource so as to be suitable for application instances requiring the configuration. After modifying operation 308 is completed, control passes to determining operation 309.

At determining operation 309, a second path is determined. The second path may be determined according to any of the exemplary conventions discussed above in regards to FIG. 2. In an embodiment of the present invention, the second path is dependent on the identity of the configuration. The second path may include a directory having a name based on the identity of the configuration.

In an embodiment of the present invention, the second path comprises an element within a namespace. The element is determined by the metadata for configuration of the application instance read at reading operation 302.

After determining operation 309 is completed, control passes to storing operation 310.

At storing operation 310, the customized version of the resource generated at modifying operation 308 is stored in the shared resource area such that the customized version of the resource can be accessed via the second path determined at determining operation 309. If the second path includes any directories which do not yet exist, the directories may be created at storing operation 310.

After storing operation 310 is completed, control passes to markup operation 312.

At markup operation 312, the customized version of the resource generated at modifying operation 308 is marked up with metadata. The metadata may identify the configuration data which was employed to create the customized version of the resource. As a result, the configuration of the specific application instance for which the shared resource was modified may be stored along with the customized version of the resource. In an embodiment of the present invention, the metadata is added to the customized version of the resource.

In another embodiment of the present invention, the metadata is added to a catalog which is external to the customized version of the resource. Such a catalog may be similar to the XML metadata file described in regards to FIG. 2. In another embodiment of the present invention, markup operation 312 is omitted.

Markup operation 312 may comprise cataloging the customized version of the resource and/or a customized version of a configuration in which it is included. Cataloging may comprise adding an indication of the existence of the customized version of the resource and/or the configuration to a repository of metadata. Cataloging may additionally comprise noting properties regarding the customized version of the resource and/or the configuration in such a repository of metadata. The repository of metadata may be an XML file such as the exemplary XML metadata file described in regards to FIG. 2.

After markup operation 312 is completed, control passes to linking operation 314.

At linking operation 314, a symbolic link is created having an origin of the first path and a destination of the second path. The symbolic link may be created using any of a variety of techniques for creating symbolic links which are well known in the art.

Thus, the application instance is configured to access the customized version of the resource using the first path. However, the symbolic link causes requests to access the resource having the first path to instead access the resource having the second path. Therefore, the application instance accesses the customized version of the resource located at the second path. Accordingly, the application instance is correctly configured to access the customized version of the resource. Processing of the present resource for the present configuration is therefore complete.

It is noted that determining operation 315 and linking operation 316 are performed only if the configuration existed at the time of the determination whether the configuration exists in the shared resource area.

At determining operation 315, a second path is determined such that the resource included in the configuration can be accessed via the second path. It is noted that determining operation 315 is performed only if the configuration exists. After determining operation 315 is completed, control passes to storing operation 316.

At linking operation 316, a symbolic link is created having an origin of the first path and a destination of the second path determined at determining operation 315.

Thus, the application instance is configured to access the customized version of the resource using the first path. However, the symbolic link causes requests to access the resource having the first path to instead access the customized version of the resource included in the configuration which already exists in the shared resource area. Therefore, the application instance is correctly configured to access the customized version of the resource. Processing of the present resource for the present configuration is therefore complete.

Figure 4:
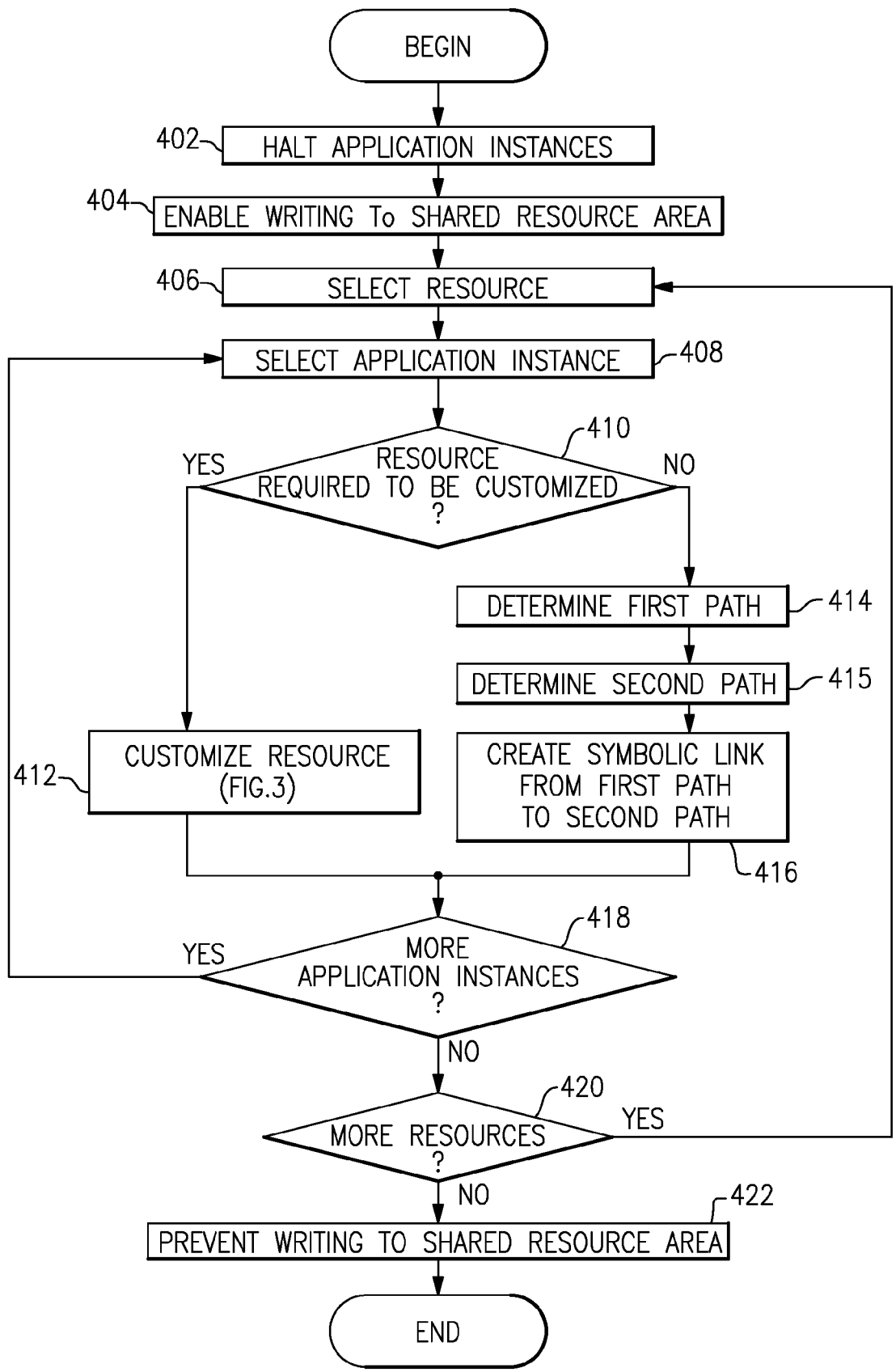
FIG. 4 demonstrates an exemplary flowchart of operations performed by the present invention to customize one or more resources in order to configure one or more application instances.

Turning now to FIG. 4, an exemplary flowchart of operations performed by the present invention to customize one or more resources in order to configure one or more application instances is demonstrated. The operations demonstrated in the flowchart may be performed by an installer such as the exemplary installer of FIG. 1.

In an embodiment of the present invention, two mutually exclusive phases exist. In the first phase, known as the "maintenance time", no application instances are executing. For example, a server may have been made unavailable to end users. In the second phase, known as the "runtime", the application instances are executing.

During maintenance time, maintenance may be applied to the shared resource area. Such maintenance may include, for example, updating a version of a configuration to include a new version of a JAR file. During maintenance time, modifications to configurations and resources included therein may occur. The results of such modifications may be stored at the shared resource area. More generally, during maintenance time, the installer may create, update and delete files as needed within the shared resource area. For example, the initial installation of a base version of a configuration may occur during maintenance time. In an embodiment of the present invention, nothing is written to the application instance area during maintenance time.

It may be possible to modify the shared resource area only during maintenance time. Thus, data stored at the shared resource area, such as configurations and customized resources stored thereat, may be modifiable only during maintenance time. The shared resource area and the shared resources stored thereat may be immutable during runtime.

Moreover, it is contemplated that it is necessary to modify the shared resource area and the configurations and customized resources stored therein only during maintenance time. It is contemplated that the program code cannot be modified during runtime and therefore must be modified during maintenance time instead. Even if it is possible, modifying resources located at the shared resource area while an application instance is executing may be disadvantageous. An application instance may analyze its configuration only upon initialization and may fail to honor any configuration changes made after initialization is complete. Alternatively, changing configuration information while an application instance is executing may be harmful if the application instance does not expect its configuration to change during runtime.

It is noted that the exemplary operations shown in FIG. 4 may begin at a point in time where runtime is transitioning to maintenance time.

At halting operation 402, any executing application instances are halted. Halting operation 402 may have no effect if no application instances were executing. After halting operation 402 is completed, control passes to enabling operation 404.

At enabling operation 404, writing to a shared resource area is enabled. The shared resource area may be similar to the shared resource area shown in FIGS. 1 and 2. For the reasons previously noted, writing to the shared resource area may be prevented during runtime. Enabling operation 404 reverses this condition so that data located at the shared resource area are writeable during maintenance time.

In an embodiment of the present invention, enabling operation 404 comprises unmounting the shared resource area. The shared resource area is subsequently remounted in a writeable mode. It is noted that as a result, the shared resource area may be mounted in a writeable mode only during maintenance time.

After enabling operation 404 is completed, control passes to selecting operation 406.

At selecting operation 406, one of the remaining resources is selected. After selecting operation 406 is completed, control passes to selecting operation 408.

At selecting operation 408, one of the remaining application instances is selected. After selecting operation 408 is completed, control passes to determining operation 410.

At determining operation 410, it is determined whether the resource selected at selecting operation 406 is required to be customized for the configuration required by the application instance selected at selecting operation 408. If it is determined that the resource is required to be customized for the configuration, control passes to customizing operation 412. If instead it is determined that the resource is not required to be customized for the configuration, control passes to determining operation 414.

At customizing operation 412, the resource selected at selecting operation 406 is customized to configure the application instance selected at selecting operation 408. Customizing operation 412 may comprise performing the operations shown in FIG. 3 on the selected resource and application instance. However, determining operation 306, which determines whether a configuration associated with the application instance exists, may be performed only once per application instance. The result may be reused for all resources configured for the application instance.

The present sequence of operations may therefore repeat customizing operation 412 for each of a plurality of application instances. At least two of the plurality of application instances for which customizing operation 412 is repeated may be associated with the same configuration. In an embodiment of the present invention, linking operation 314 and linking operation 316 of FIG. 3 may cause the destination of the symbolic link to be the same for each of the at least two of the plurality of application instances associated with the same configuration. For example, the second path may be determinate such that for a given identity, the second path will always have the same value. In this case, the second path will be the same for any application instance associated with the configuration having the given identity.

After customizing operation 412 is completed, control passes to determining operation 418.

At determining operation 414, a first path is determined. Determining operation 414 may comprise the same operations as determining operation 304 of FIG. 3. After determining operation 414 is completed, control passes to determining operation 415.

It is noted that in the exemplary operations shown in FIG. 3, if the customized version of the configuration does not exist, the base version of the resource is modified and the customized version of the resource is stored. In the present sequence of operations, in the case where the configuration does not exist, modifying the base version of the resource and storing the customized version of the resource are omitted.

At determining operation 415, a second path is determined such that the base version of the resource can be accessed via the second path. After determining operation 415 is completed, control passes to linking operation 416.

At linking operation 416, a symbolic link is created having an origin of the first path and a destination of the second path. It is noted that the base version of the resource can therefore be accessed via the symbolic link thus created. After linking operation 416 is completed, control passes to determining operation 418.

At determining operation 418, it is determined whether at least one application instance remains. If at least one application instance remains, control returns to selecting operation 408. Otherwise, control passes to determining operation 420.

If only one application instance is being configured, determining operation 418 may have no effect because the sequence of operations beginning with determining operation 410 is executed exactly once in this case. Thus, when only one application instance is being configured, determining operation 418 may be omitted. If a plurality of application instances is being configured, determining operation 418 causes the sequence of operations beginning with determining operation 410 to be repeated for each of the plurality of application instances.

At determining operation 420, it is determined whether at least one resource remains. If at least one resource remains, control returns to selecting operation 406. In this case, all application instances are deemed unprocessed so that the next resource is processed for each application instance. Otherwise, control passes to preventing operation 422.

If only one resource is being configured, determining operation 420 may have no effect because the sequence of operations beginning with selecting operation 408 is executed exactly once in this case. Thus, when only one resource is being configured, determining operation 420 may be omitted. If a plurality of resources is being configured, determining operation 420 causes the sequence of operations beginning with selecting operation 408 to be repeated for each of the plurality of resources.

The present invention does not require iterating over application instances and then iterating over resources for each application instance. In an embodiment of the present invention, the order of selecting operation 406 and selecting operation 408 is reversed. Similarly, the order of determining operation 418 and determining operation 420 is reversed. As a result, the sequence of operations iterates over resources and then iterates over application instances for each resource.

At preventing operation 422, writing is prevented to the shared resource area. After preventing operation 422 is completed, the maintenance time may end and runtime may begin again. Thus, application instances may execute subsequently to preventing operation 422. Therefore, preventing operation 422 prevents writing to the shared resource area while an application instance is executing.

In an embodiment of the present invention, preventing operation 422 comprises unmounting the shared resource area. The shared resource area is subsequently remounted in a read-only mode. The z/OS operating system and most flavors of the UNIX operating system include functionality for mounting a volume in a read-only mode such that no user, including a superuser, can write to the volume. To write to a volume mounted in this manner, it is necessary to unmount the volume and remount the volume in a writeable mode. Preventing operation 422 may employ this functionality of z/OS or UNIX to mount the shared resource area in a read-only mode.

As a result of preventing operation 422, an application instance cannot alter the shared resources, e.g., the JAR files, by itself. This is the case because the JAR files are read-only during runtime, yet the application instance only executes during runtime. It is noted that even if preventing operation 422 is not performed, the application instance may be unable to alter the shared resources for other reasons. For example, file system permissions may prevent such alterations. Thus, another technological device, such as the installer, must alter any shared resources.

In the embodiment of the present invention described above wherein the shared resource area is writeable while the application instances are executing, enabling operation 404 and preventing operation 422 are omitted.

It is noted that as a result of the operations demonstrated in FIG. 4, the symbolic links are completely established during maintenance time. Therefore, the symbolic links exist during runtime. An application instance may therefore employ the symbolic links to access configuration resources at any time during runtime.

Figure 5:
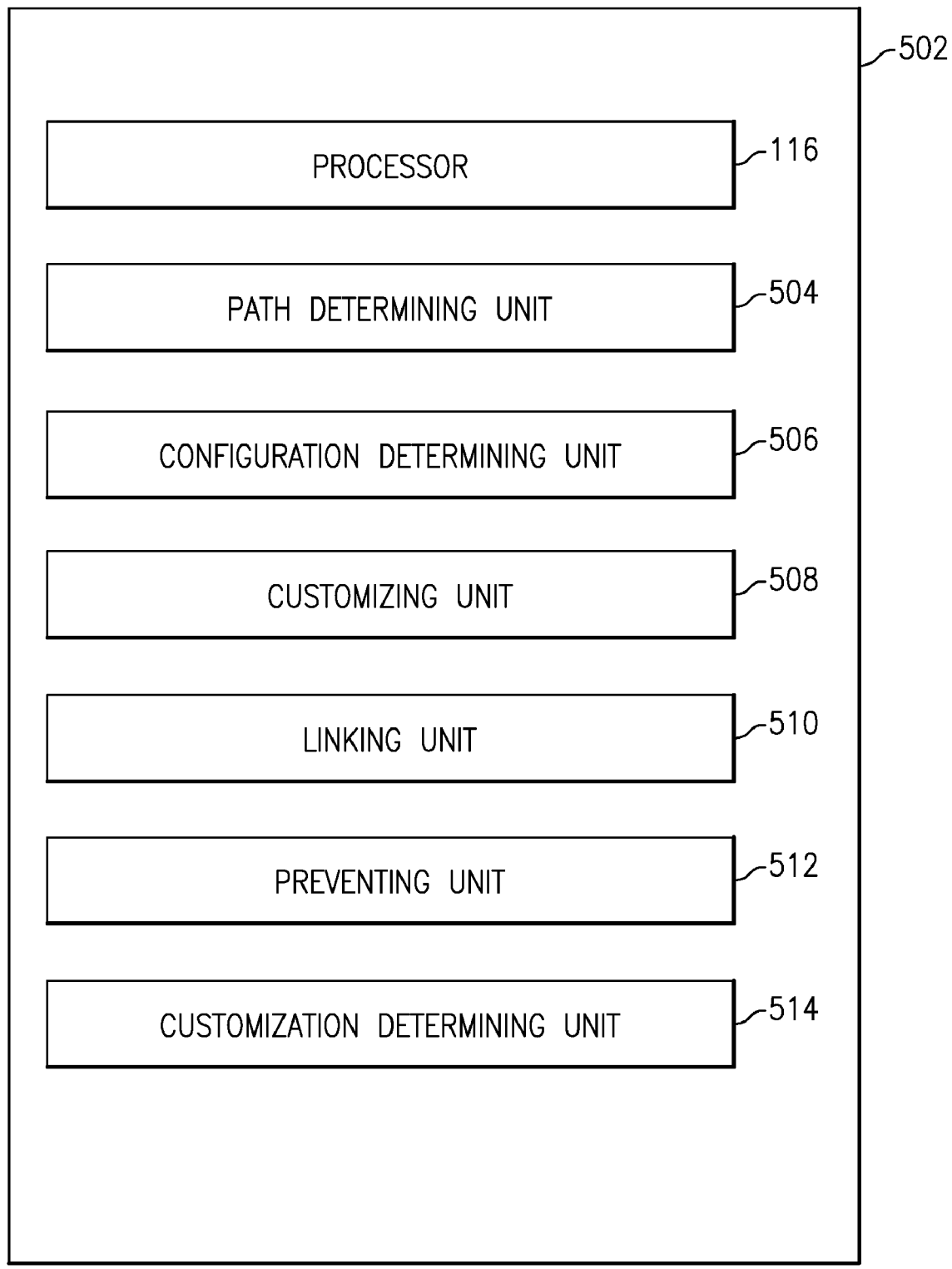
FIG. 5 demonstrates an exemplary system for customizing a resource used to configure an application instance, the system embodying the present invention.

Turning now to FIG. 5, an exemplary system for customizing a resource used to configure an application instance is demonstrated, the system embodying the present invention.

The system 502 includes a processor 116. The processor may be similar to the exemplary processor shown in FIG. 1.

The system further includes a path determining unit 504. The path determining unit is configured to determine a first path, wherein the application instance is configured to access a version of a resource via the first path. Accordingly, the path determining unit may be configured to perform the operations described above for determining operation 304 of FIG. 3.

The system further includes a configuration determining unit 506. The configuration determining unit is configured to determine whether a configuration associated with the application instance exists in a shared resource area. Accordingly, the configuration determining unit may be configured to perform the operations described above for determining operation 306 of FIG. 3.

The system further includes a customizing unit 508. The customizing unit is configured to generate a customized version of the resource in the event that the configuration determining unit 506 determined that the configuration does not exist.

Specifically, the customizing unit 508 is configured to, if the configuration determining unit 506 determined that the configuration does not exist, modify a base version of the resource to generate a customized version of the resource. Accordingly, the customizing unit may be configured to perform the operations described above for modifying operation 308 of FIG. 3 when this condition is present.

The customizing unit 508 is further configured to, if the configuration determining unit 506 determined that the configuration does not exist, determine a second path. Accordingly, the customizing unit may be configured to perform the operations described above for determining operation 309 of FIG. 3 when this condition is present.

The customizing unit 508 is further configured to, if the configuration determining unit 506 determined that the configuration does not exist, store the customized version of the resource in the shared resource area such that the customized version of the resource can be accessed via the second path. Accordingly, the customizing unit may be configured to perform the operations described above for storing operation 310 of FIG. 3 when this condition is present.

In an embodiment of the present invention, the configuration has an identity. The customizing unit 508 is configured to cause the second path to be dependent on the identity of the configuration. The customizing unit 508 may cause the second path to follow any of the exemplary conventions discussed above in regards to FIG. 2. In a further embodiment of the present invention, the second path includes a directory. The directory has a name based on the identity of the configuration.

The customizing unit 508 may be further configured to, if the configuration determining unit 506 determined that the configuration does not exist, perform the operations described above for markup operation 312 of FIG. 3.

The customizing unit 508 may additionally perform operations even if the configuration exists. Thus, the customizing unit 508 may be further configured to, if the configuration determining unit 506 determined that the configuration exists, determine the second path such that the resource included in the configuration can be accessed via the second path. Accordingly, the customizing unit may be configured to perform the operations described above for determining operation 315 of FIG. 3 when this condition is present.

The system further includes a linking unit 510. The linking unit is configured to create symbolic links. Specifically, the linking unit is configured to create a symbolic link having an origin of the first path and a destination of the second path. Accordingly, the customizing unit may be configured to perform the operations described above for linking operation 314 and linking operation 316 of FIG. 3.

The system may further include a preventing unit 512. The preventing unit is configured to prevent writing to the shared resource area while the application instance is executing. Accordingly, the preventing unit may be configured to perform the operations described above for preventing operation 422 of FIG. 4. The preventing unit may be further configured to perform the operations described above for enabling operation 404 of FIG. 4.

The system may further include a customization determining unit 514. The customization determining unit is configured to determine whether the resource is required to be customized for the configuration. Accordingly, the customization determining unit may be configured to perform the operations described above for determining operation 410 of FIG. 4.

In an embodiment of the present invention, the system 502 is configured to operate on each of a plurality of application instances. The customizing unit 508 is configured to, if the customization determination unit 514 determined that the resource is not required to be customized and the configuration determining unit 506 determined that the configuration does not exist, omit modifying the base version of the resource, omit storing the customized version of the resource, and determine the second path such that the base version of the resource can be accessed via the second path.

In an embodiment of the present invention, the system 502 is configured to operate on each of a plurality of resources. The customizing unit 508 is configured to, if the customization determination unit 514 determined that the resource is not required to be customized and the configuration determining unit 506 determined that the configuration does not exist, omit modifying the base version of the resource, omit storing the customized version of the resource, and determine the second path such that the base version of the resource can be accessed via the second path.

In an embodiment of the present invention, the system 502 is configured to operate on each of a plurality of application instances. At least two of the plurality of application instances are associated with the same configuration. When this condition holds, the linking unit 510 is configured to cause the destination of the symbolic link to be the same for each of the at least two of the plurality of application instances associated with the same configuration.

Figure 6:
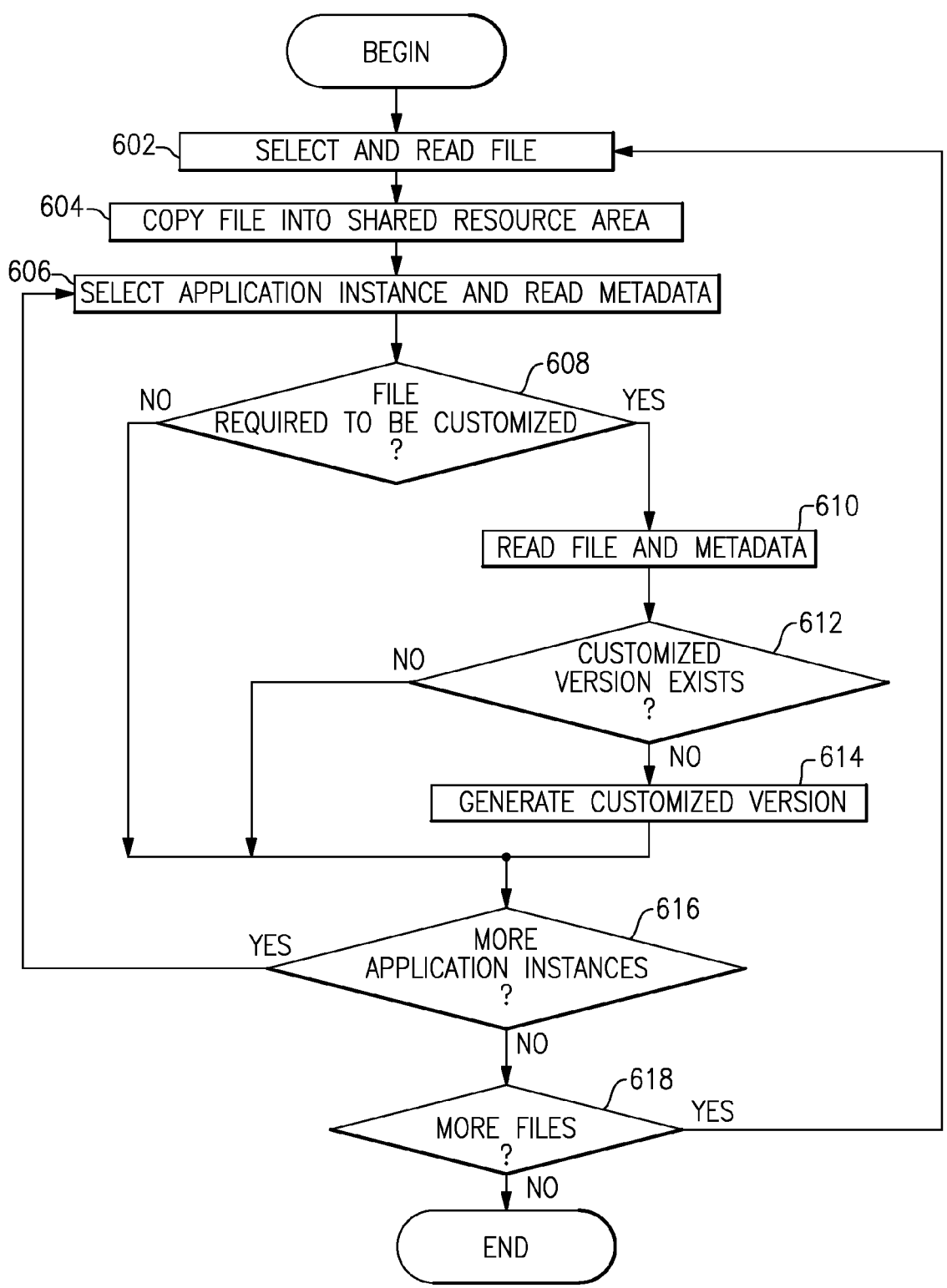
FIG. 6 shows an exemplary flowchart of operations for installing an update package according to the present invention.

FIG. 6 shows an exemplary flowchart of operations for installing an update package according to the present invention. The update package includes one or more files. Each file may be the base version of a resource.

At reading operation 602, one of the remaining files in the update package is selected. The selected file is read. After reading operation 602 is completed, control passes to copying operation 604.

At copying operation 604, the file read at reading operation 602 is copied into the shared resource area. The shared resource area may be similar to the shared resource area shown in FIGS. 1 and 2. If the file is a base version of a resource, the base version of the resource is now stored at the shared resource area. After copying operation 604 is completed, control passes to reading operation 606.

At reading operation 606, one of the remaining application instances is selected. The configuration metadata for the selected application instance is read. After reading operation 606 is completed, control passes to determining operation 608.

At determining operation 608, it is determined whether the file selected at reading operation 602 requires customization for the application instance selected at reading operation 606. Determining operation 608 may comprise operations such as those described above for determining operation 410 of FIG. 4. If the file requires customization, control passes to reading operation 610. If the file does not require customization, control passes to determining operation 616.

At reading operation 610, the file selected at reading operation 602 is read. Furthermore, metadata related to the configuration of the application instance is read. Reading operation 610 may comprise operations such as those described above for reading operation 302 of FIG. 3. After reading operation 610 is completed, control passes to determining operation 612.

At determining operation 612, it is determined whether the customized version of the file selected at reading operation 604 exists. Determining operation 612 may comprise operations such as those described above for determining operation 306 of FIG. 3. After determining operation 612 is completed, control passes to customizing operation 614.

At customizing operation 614, a customized version of the file is generated. Such generation may comprise operations such as those described above for modifying operation 308 of FIG. 3. The customized version of the file is stored in the shared resource area. Such storage may comprise operations such as those described above for determining operation 309 and storing operation 310 of FIG. 3. After customizing operation 614 is completed, control passes to determining operation 616.

In an embodiment of the present invention, a predefined process is configured to perform reading operation 610, determining operation 612 and customizing operation 614.

At determining operation 616, it is determined whether at least one application instance remains. If at least one application instance remains, control returns to reading operation 606. Otherwise, control passes to determining operation 618.

At determining operation 618, it is determined whether at least one file remains in the update package. If at least one file remains, control returns to reading operation 602. In this case, all application instances are deemed unprocessed so that the next file is processed for each application instance. If no files remain in the update package, installation of the update package is complete.

Figure 7:
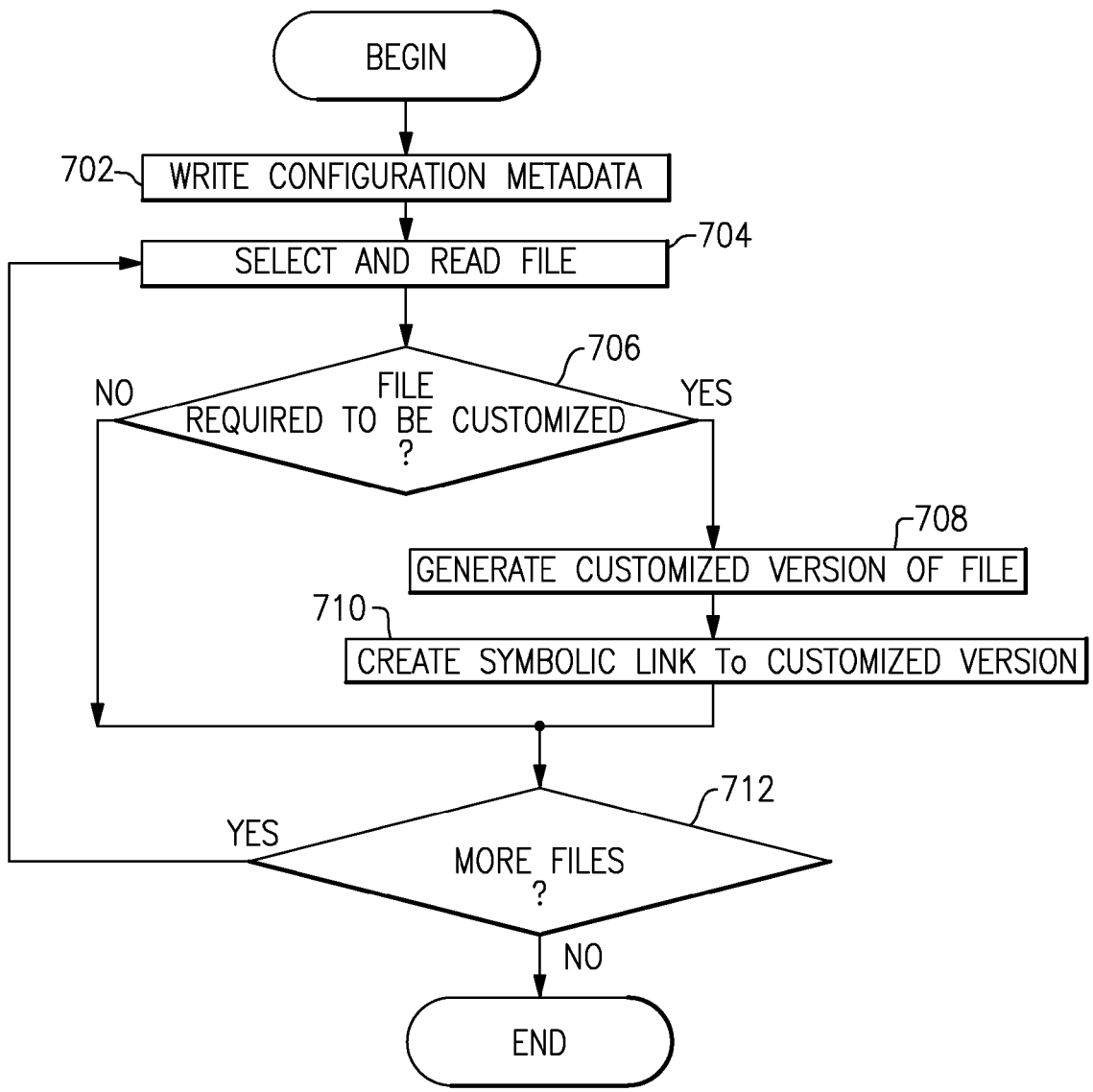
FIG. 7 demonstrates an exemplary flowchart of operations for installing an application instance according to the present invention.

Turning now to FIG. 7, an exemplary flowchart of operations for installing an application instance according to the present invention is demonstrated. An installation package is employed to install the application instance. The installation package includes one or more files. Each file may be the base version of a resource.

At writing operation 702, metadata for the configuration of the application instance are written to a storage medium. The metadata may be written to a directory associated with the application instance. The directory may be stored at an application instance area such as the exemplary application instance area described in regards to FIGS. 1 and 2. After writing operation 702 is completed, control passes to reading operation 704.

At reading operation 704, one of the remaining files in the installation package is selected. The selected file is read. After reading operation 704 is completed, control passes to determining operation 706.

At determining operation 706, it is determined whether the file selected at reading operation 704 requires customization for the application instance being installed. Determining operation 706 may comprise operations such as those described above for determining operation 410 of FIG. 4. If the file requires customization, control passes to customizing operation 708. If the file does not require customization, control passes to determining operation 712.

At customizing operation 708, a customized version of the file is generated. Customizing operation 708 may invoke a predefined process such as the process described above in regards to FIG. 6 and configured to perform reading operation 610, determining operation 612 and customizing operation 614 of FIG. 6.

At linking operation 710, a symbolic link is created. The destination of the symbolic link is the customized version of the file generated at customizing operation 708. After linking operation 710 is completed, control passes to determining operation 712.

At determining operation 712, it is determined whether at least one file remains in the installation package. If at least one file remains, control returns to reading operation 704. If no files remain in the installation package, installation of the installation package is complete.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for configuring an application instance, the method comprising:
   determining a first path in a hierarchical file system, the hierarchical file system including a plurality of directories, wherein the application instance is configured to access a version of a resource via the first path;
   determining whether a configuration associated with the application instance exists in a shared resource area;
   if the configuration does not exist, modifying a base version of the resource to generate a customized version of the resource, determining a second path in the hierarchical file system, and storing the customized version of the resource in the shared resource area such that the customized version of the resource can be accessed via the second path, wherein the second path includes a directory, the configuration has an identity and the second path is dependent of the identity of the configuration, the directory having a name based on the identity of the configuration;
   if the configuration exists, determining the second path such that the resource included in the configuration can be accessed via the second path; and
   creating a symbolic link having an origin of the first path and a destination of the second path, the symbolic link linking a first file in a directory of a file system to a second file in the file system such that a request to access the first file results in accessing the second file instead of the first file, wherein the second file is the customized version of the resource located at the second path.

2. The method of claim 1, further comprising preventing writing to the shared resource area while the application instance is executing.

3. The method of claim 1, further comprising repeating the steps in claim 1 for each of a plurality of application instances, wherein at least two of the plurality of application instances are associated with the same configuration; and
   wherein the destination of the symbolic link is the same for each of the at least two of the plurality of application instances associated with the same configuration.

4. The method of claim 1, further comprising:
   repeating the steps in claim 1 for each of a plurality of application instances;
   on each iteration, determining whether the resource is required to be customized for the configuration; and
   on each iteration, if it is determined that the resource is not required to be customized for the configuration and the configuration does not exist, omitting modifying the base version of the resource, omitting storing the customized version of the resource, and determining the second path such that the base version of the resource can be accessed via the second path.

5. The method of claim 1, further comprising:
   repeating the steps in claim 1 for each of a plurality of resources;
   on each iteration, determining whether the resource is required to be customized for the configuration;
   on each iteration, if it is determined that the resource is not required to be customized for the configuration and the configuration does not exist, omitting modifying the base version of the resource, omitting storing the customized version of the resource, and determining the second path such that the base version of the resource can be accessed via the second path.

6. The method of claim 1, wherein the shared resource area includes the base version of the resource and the customized version of the resource, the base version of the resource being a different file than the customized version of the resource.

7. A system for configuring an application instance, the system comprising:
   a processor;
   a memory;
   a path determining unit configured to determine a first path in a hierarchical file system, the hierarchical file system including a plurality of directories, wherein the application instance is configured to access a version of a resource via the first path;
   a configuration determining unit configured to determine whether a configuration associated with the application instance exists in a shared resource area;
   a customizing unit configured to:
      if the configuration determining unit determined that the configuration does not exist, modify a base version of the resource to generate a customized version of the resource, determine a second path in the hierarchical file system, and store the customized version of the resource in the shared resource area such that the customized version of the resource can be accessed via the second path, wherein the second path includes a directory, the configuration has an identity and the second path is dependent of the identity of the configuration, the directory having a name based on the identity of the configuration, and
      if the configuration determining unit determined that the configuration exists, determining the second path such that the resource included in the configuration can be accessed via the second path; and
   a linking unit configured to create a symbolic link having an origin of the first path and a destination of the second path, the symbolic link linking a first file in a directory of a file system to a second file in the file system such that a request to access the first file results in accessing the second file instead of the first file, wherein the second file is the customized version of the resource located at the second path.

8. The system of claim 7, further comprising a preventing unit configured to prevent writing to the shared resource area while the application instance is executing.

9. The system of claim 7, wherein:
   the system is configured to operate on each of a plurality of application instances;
   at least two of the plurality of application instances are associated with the same configuration; and
   the destination of the symbolic link is the same for each of the at least two of the plurality of application instances associated with the same configuration.

10. The system of claim 7, further comprising a customization determination unit configured to determine whether the resource is required to be customized for the configuration, and wherein:
   the system is configured to operate on each of a plurality of application instances;
   the customizing unit is configured to, if the customization determination unit determined that the resource is not required to be customized and the configuration determining unit determined that the configuration does not exist, omit modifying the base version of the resource, omit storing the customized version of the resource, and determine the second path such that the base version of the resource can be accessed via the second path.

11. The system of claim 7, further comprising a customization determination unit configured to determine whether the resource is required to be customized for the configuration, and wherein:
   the system is configured to operate on each of a plurality of resources;
   the customizing unit is configured to, if the customization determination unit determined that the resource is not required to be customized and the configuration determining unit determined that the configuration does not exist, omit modifying the base version of the resource, omit storing the customized version of the resource, and determine the second path such that the base version of the resource can be accessed via the second path.

12. A non-transitory computer readable memory storing a computer program product, the computer program product comprising:
   computer readable program codes coupled to the computer readable memory for configuring an application instance, the computer readable program codes configured to cause the program to:
   determine a first path in a hierarchical file system, the hierarchical file system including a plurality of directories, wherein the application instance is configured to access a version of a resource via the first path;
   determine whether a configuration associated with the application instance exists in a shared resource area;
   if the configuration does not exist, modify a base version of the resource to generate a customized version of the resource, determine a second path in the hierarchical file system, and store the customized version of the resource in the shared resource area such that the customized version of the resource can be accessed via the second path, wherein the second path includes a directory, the configuration has an identity and the second path is dependent of the identity of the configuration, the directory having a name based on the identity of the configuration;

if the configuration exists, determine the second path such that the resource included in the configuration can be accessed via the second path; and create a symbolic link having an origin of the first path and a destination of the second path, the symbolic link linking a first file in a directory of a file system to a second file in the file system such that a request to access the first file results in accessing the second file instead of the first file, wherein the second file is the customized version of the resource located at the second path.

13. The non-transitory computer readable memory of claim 12, wherein the computer readable program codes are further configured to cause the program to prevent writing to the shared resource area while the application instance is executing.

14. The non-transitory computer readable memory of claim 12, wherein the computer readable program codes are further configured to repeat the operations in claim 15 for each of a plurality of application instances, wherein at least two of the plurality of application instances are associated with the same configuration; and wherein the destination of the symbolic link is the same for each of the at least two of the plurality of application instances associated with the same configuration.

15. The non-transitory computer readable memory of claim 12, wherein the computer readable program codes are further configured to:

repeat the operations in claim 15 for each of a plurality of application instances;

on each iteration, determine whether the resource is required to be customized for the configuration; and on each iteration, if it is determined that the resource is not required to be customized for the configuration and the configuration does not exist, omit modifying the base version of the resource, omit storing the customized version of the resource, and determine the second path such that the base version of the resource can be accessed via the second path.

* * * * *